United States Patent [19]

Isono et al.

[11] Patent Number: 5,072,440
[45] Date of Patent: Dec. 10, 1991

[54] SELF-ROUTING SWITCHING SYSTEM HAVING DUAL SELF-ROUTING SWITCH MODULE NETWORK STRUCTURE

[75] Inventors: Osamu Isono; Toshimasa Fukui; Tetsuo Nishino; Tetsuo Tachibana; Ryuji Hyodo, all of Kawasaki; Eisuke Iwabuchi, Yokohama, all of Japan

[73] Assignee: Fujitsu Limited, Kawasaki, Japan

[21] Appl. No.: 484,769

[22] Filed: Feb. 26, 1990

[30] Foreign Application Priority Data

Mar. 1, 1989 [JP] Japan .................................. 1-49061
Mar. 20, 1989 [JP] Japan .................................. 1-68424

[51] Int. Cl.$^5$ ..................... H04L 12/56; H04Q 11/04
[52] U.S. Cl. ....................................... 370/60; 370/16; 340/827
[58] Field of Search ................. 370/60, 60.1, 61, 94.1, 370/94.3, 54, 16, 58.1; 371/8.1, 8.2, 11.1, 11.2; 340/825.01, 825.02, 827

[56] References Cited

U.S. PATENT DOCUMENTS

| | | | |
|---|---|---|---|
| 3,886,318 | 5/1975 | Charramsol et al. | 370/16 |
| 4,228,535 | 10/1980 | Workman et al. | 370/16 |
| 4,477,895 | 10/1984 | Casper et al. | 370/16 |
| 4,535,442 | 8/1985 | Maddern et al. | 370/58.3 |
| 4,543,651 | 9/1985 | Chang | 370/16 |
| 4,603,416 | 7/1986 | Servel et al. | 370/60 |
| 4,782,478 | 11/1988 | Day et al. | 370/60 |
| 4,837,761 | 6/1989 | Usanu et al. | 370/60 |
| 4,920,531 | 4/1990 | Isono et al. | 370/60 |
| 4,947,388 | 8/1990 | Kawahara et al. | 370/60 |
| 4,965,790 | 10/1990 | Nishino et al. | 370/85.12 |
| 4,993,018 | 2/1991 | Hajikano et al. | 370/60 |

FOREIGN PATENT DOCUMENTS

| | | |
|---|---|---|
| 0113639 | 7/1984 | European Pat. Off. . |
| 0206403 | 12/1986 | European Pat. Off. . |
| WO88/05982 | 8/1988 | World Int. Prop. O. . |

OTHER PUBLICATIONS

Feng et al., "A Microprocessor Controlled Asynchronous Circuit Switching Network", The 6th Annual Symposium on Computer Architecture, Apr. 23-25, 1979, IEEE, pp. 202-215.

Turner, J. S., "Design of an Integrated Services Packet Network", IEEE Journal on Selected Areas in Communications, vol. SAC-4, No. 8, Nov. 1986, pp. 1373-1380.

Paranjpe et al., "A New Concept for Supermodular Alignment Network", International Journal of Electronics, vol. 56, No. 6, Jun. 1984, pp. 815-822.

Kumar et al., "Switching Strategies in Shuffle-Exchange Packet-Switched Networks", IEEE Transactions on Computers, vol. C-34, No. 2, Feb. 1985, pp. 180-186.

Nagasawa et al., "Packet Switching Network Access Protocols for Multi-Media Packet Communications", Journal of the Institution of Electronic and Radio Engineers, vol. 56, No. 6/7, Jun./Jul. 1986, pp. 243-247.

McMillen et al., "Performance and Implementation of 4×4 Switching Nodes in an Interconnection Network for PASM", Proceedings of the 1981 International Conference on Parallel Processing, Apr. 25-28, 1981, IEEE, pp. 229-233.

Primary Examiner—Douglas W. Olms
Assistant Examiner—H. Kizou
Attorney, Agent, or Firm—Staas & Halsey

[57] ABSTRACT

A self-routing switching system connected between input highways and output highways, includes conversion modules, doubled SRM networks, output modules, and first and second selectors. Normally, one of the SRM networks is connected between the conversion modules and output modules through the first and second selectors. When a request to switch the active network to the other SRM network is received, the first and second selectors switch connections to the conversion modules and output modules so that the other SRM network is connected between the conversion modules and output modules. Before actually switching the connections, it is determined whether or not all cells have been discharged from the active SRM network.

23 Claims, 13 Drawing Sheets

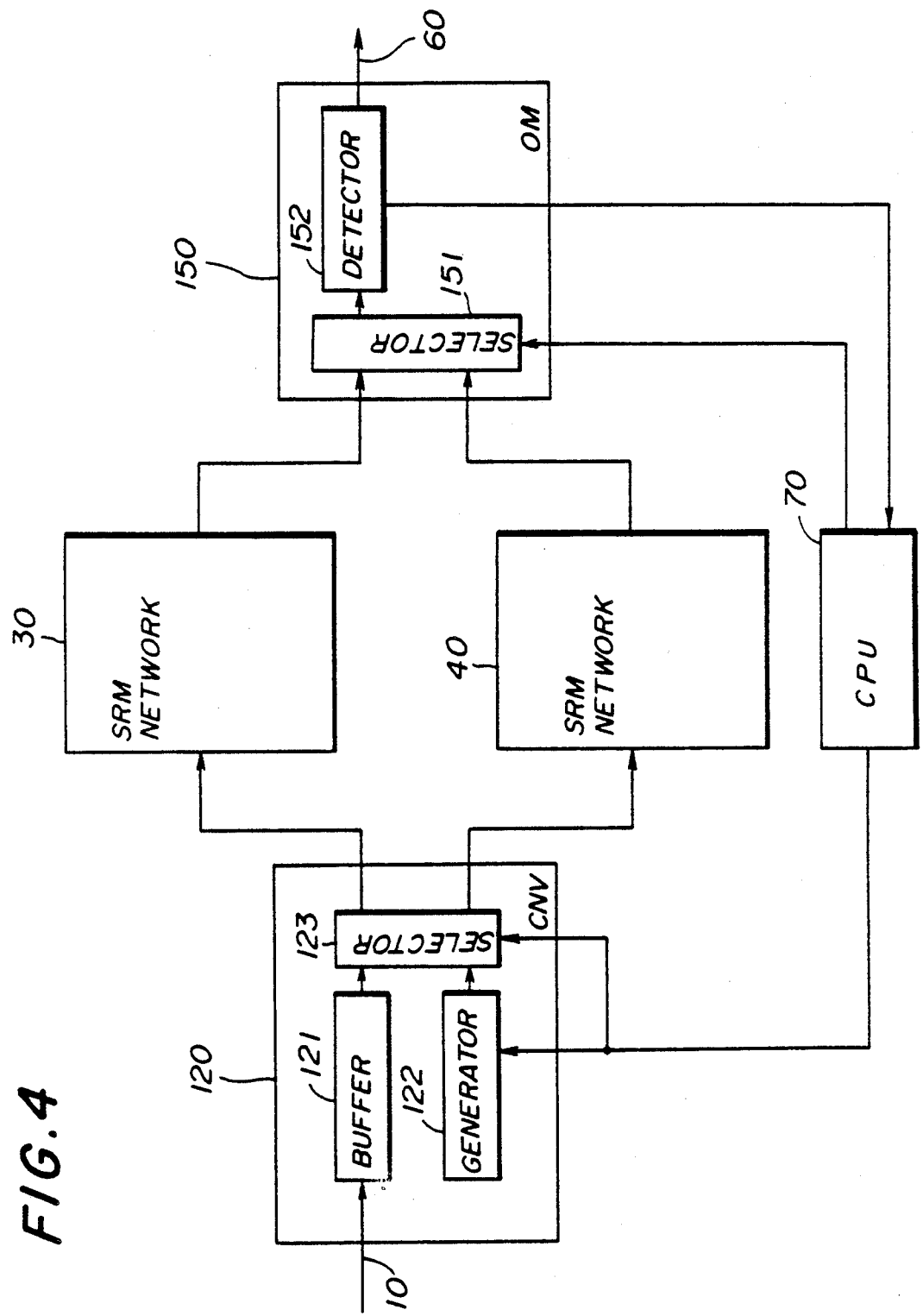

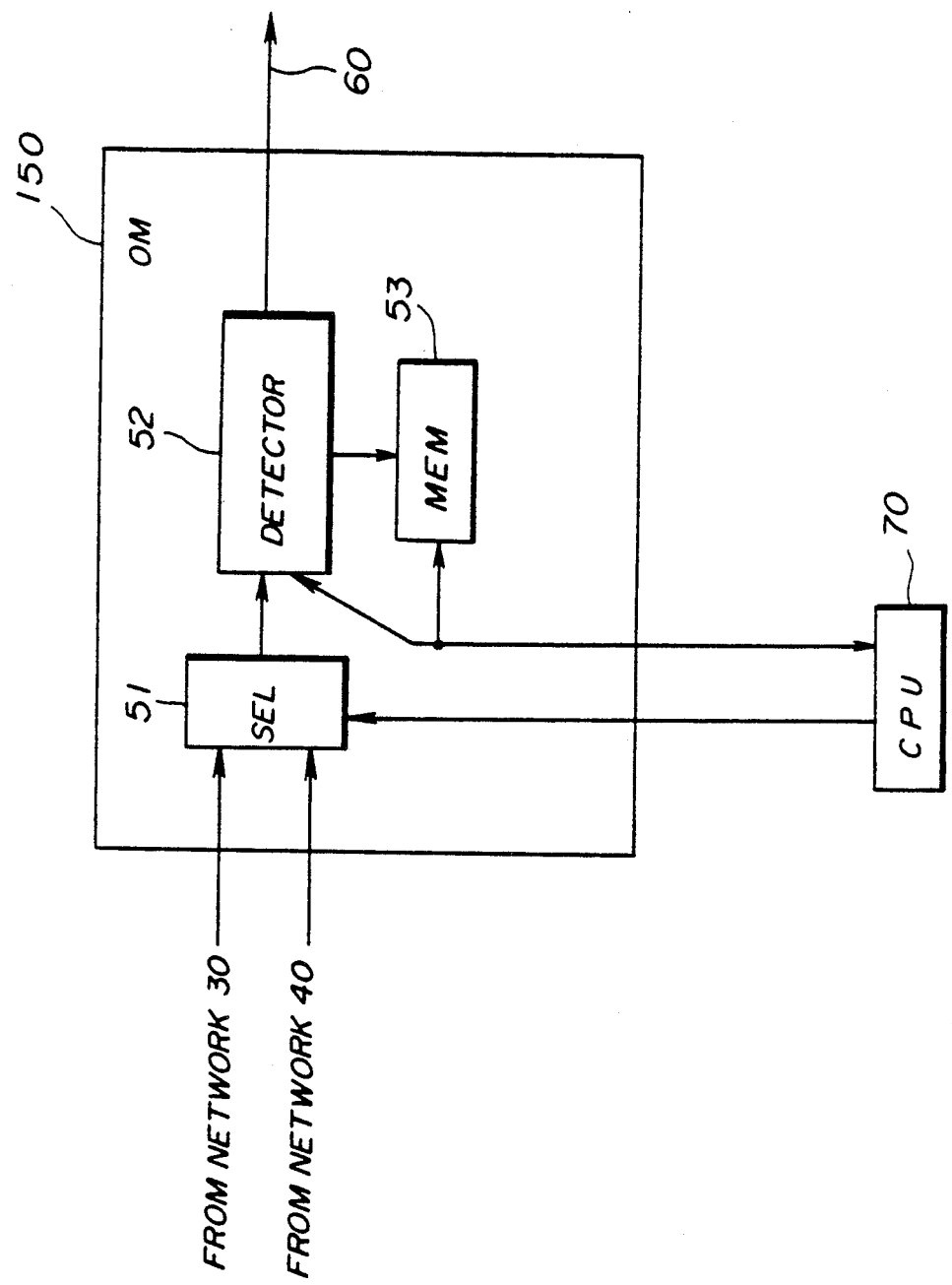

SELF-ROUTING SWITCHING SYSTEM HAVING DUAL SELF-ROUTING SWITCH MODULE NETWORK STRUCTURE

BACKGROUND OF THE INVENTION

1. Field of the Invention

The present invention generally relates to a self-routing switching system, and particularly to a self-routing switching system which is optimal for use for high-speed packet switching or asynchronous transfer mode (ATM) switching.

2. Description of the Related Art

As is well known, a self-routing switch module network providing speech paths is suitable for cases of high-speed switching to different outgoing lines for each packet or each cell (asynchronous transfer mode blocks), such as high-speed packet switching or asynchronous transfer mode switching, and for cases where centralized control of the speech path by software is not desired because of the need for high speed call processing.

Conventional self-routing systems have been proposed in, for example: The 6th Annual Symposium on Computer Architecture, 23-25 Apr. 1979, IEEE, (New York, US), T.-Y. Feng et al.: "A microprocessor controlled asynchronous circuit switching network", pages 202-215; IEEE Journal on Selected Areas in Communications, volume SAC-4, No. 8, Nov. 1986, IEEE (New York, US), J. S. Turner: "Design of an integrated services Packet network", pages 1373-1380; International Journal of Electronics, volume 56, No. 6, June 1984, (Basingstoke, Hampshire, GB), S. K. Paranjpe et al.: "A new concept for supermodular alignment network", pages 815-822; IEEE Transactions on Computer, volume C-34, No. 2, Feb. 1985, IEEE, (New York, US), M. Kumar et al.: "Switching strategies in shuffle-exchange Packet-switched networks", pages 180-186; Journal of the Institution of Electronic and Radio Engineers, volume 56, No. 6/7, June/July 1986, IEEE, (London, GB), M. Nagasawa et al.: "Packet switching network access protocols for multi-media packet communications", pages 243-247: European Patent Application No. 0113639 (SERVEL et al.) 18 July 1984; Proceedings of the 1981 International Conference on Parallel Processing, 25-28 Aug. 1981, IEEE, (New York, US), R. J. McMillen et al.: "Performance and implementation of 4×4 switching nodes in an interconnection network for PASM", pages 229-233; Belgium Application No. 904100 (ITT) 24 July 1986; European Patent Application No. 0206403 (RACAL) 30 Dec. 1986; and United States patent application Ser. Nos. 157,621, filed Feb. 19, 1988, 198,089, filed May 24, 1988, 280,723 filed Oct. 6, 1988 and 320,574 filed Mar. 9, 1989, now U.S. Pat. Nos. 4,920,531 issued Apr. 24, 1990, 4,837,761 issued June 6, 1989, 4,993,018 issued Feb. 12, 1991 and 4,965,790 issued Oct. 23, 1990, respectively. filed Oct. 6, 1988.

However, none of the above-identified references disclose a self-routing switching system in which a self-routing switch module network is doubled.

SUMMARY OF THE INVENTION

It is a general object of the present invention to provide an improved self-routing switching system in which the self-routing switch module network is doubled so that reliability of the system is enhanced and maintenance operation is improved.

The above object of the present invention is achieved by a self-routing switching system connected between input highways and output highways, including input input coupled to the input highways, for receiving a cell having transmission information from one of the input highways and for generating additive information indicative of a path through which the transmission information from the one of the input highways is supplied to one of the output highways; first self-routing switch module network unit for providing a plurality of paths operatively coupled between the input highways and output highways, the cell being transmitted through one of the plurality of paths indicated by the additive information; second self-routing switch module network unit for providing a plurality of paths operatively coupled between the input highways and output highways, the cell being transmitted through one of the plurality of paths indicated by the additive information; first selecting unit, provided between the input means and the first and second self-routing switch module network units, for connecting the input highways to one of the first and second self-routing switch module network units; and second selecting unit, provided between the input unit and the first and second self-routing switch module network unit, for connecting the output lines to one of the first and second self-routing switch module network units.

Another object of the present invention is to provide a self-routing switching system having doubled self-routing switch module networks which is capable of preventing information from being lost when one of the doubled self-routing switch module networks is switched to the other one.

This object of the present invention is achieved by providing the above-mentioned system with detecting unit operatively coupled to the first and second self-routing switch module network unit, for detecting a state where there is no cell in the one of the first and second self-routing units selected by the first selecting unit, the one of the first and second self-routing units functioning as an active network and the other one thereof functioning as a standby network. The first and second selecting units switch connections to the input and output lines from the active network to the standby network when the detecting means detects the state.

Further objects, features and advantages of the present invention will become apparent from the following detailed description when read in conjunction with the accompanying drawings.

BRIEF DESCRIPTION OF THE DRAWINGS

FIG. 4 is a block diagram of a second preferred embodiment of the present invention;

FIG. 7 is a block diagram of an output module provided in the configuration shown in FIG. 4;

DESCRIPTION OF THE PREFERRED EMBODIMENTS

Figure 1:
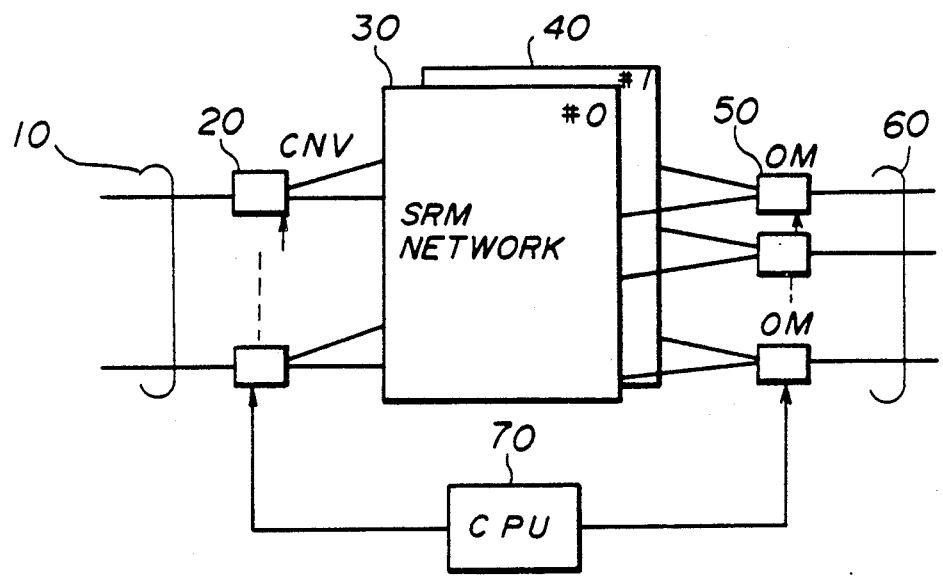
FIG. 1 is a block diagram of the entire structure of a self-routing switching system having a doubled self-routing switch module network structure according to the present invention.

A description is given of a self-routing switching system according to a first preferred embodiment of the present invention with reference to FIG. 1. The self-routing switching system shown in FIG. 1 is composed of conversion modules 20, a pair of doubled self-routing switch networks (hereinafter referred to SRM networks) 30 and 40 such as ATM switch networks, output modules 50 and a central processing unit (CPU) 70. Input highways (links) 10 are individually accommodated by the conversion modules 20. The conversion modules 20 are connected to the input ends of the SRM networks 30 and 40. Normally, one of the SRM networks 30 and 40 functions as an active network, and the other SRM network functions as a standby (reserved) network. The output modules 50 are connected to the output ends of the SRM networks 30 and 40. Output highways (links) 60 are individually connected to the output modules 50. The CPU 70 functions as a call processor and controls the conversion modules 20 and the output modules 50.

Figure 3:
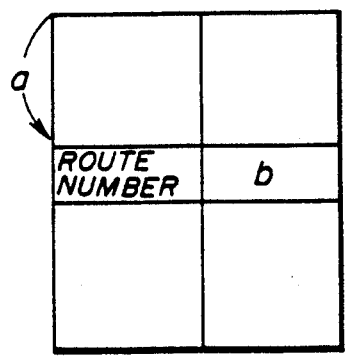
FIG. 3 is a diagram showing a virtual call number (VCN) conversion table provided in a conversion module in the system shown in FIG. 1.
Figure 2:
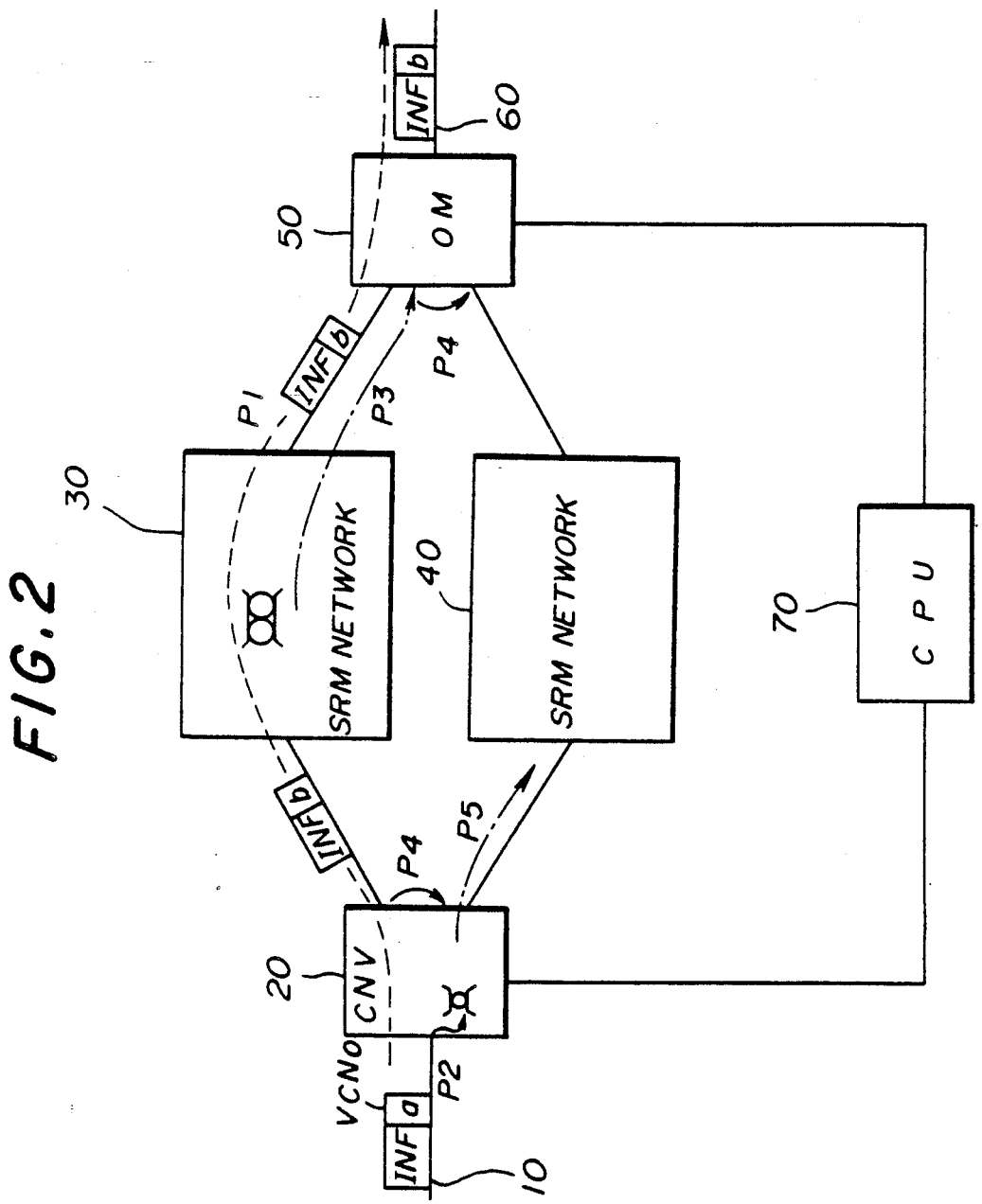
FIG. 2 is a block diagram illustrating how to switch the system from an active self-routing switch module network to a standby one according to the first embodiment of the present invention.

A description is given of the operation of the system shown in FIG. 1 with reference to FIGS. 2 and 3. It is now assumed that the SRM network 30 serves as the active network, and the SRM network 40 serves as the standby system. It is noted that in FIG. 2, one of the conversion modules 20 and one of the output modules 50 are illustrated for the sake of simplicity. An input cell on the input highway 10 is applied to the conversion module 20. As is known, an input cell on the input highway 10 is composed of a header and transmission information INF. The header includes a virtual call number $VCN_0$ of the input cell (identification information: "a" in the illustration) and a synchronizing pattern. The conversion module 20 refers to a VCN conversion table (FIG. 3) provided therein, and gets information about a route number (control information: this corresponds to a set of route headers described later) indicating a set of speech paths (lines) formed in the SRM network 30 on the basis of the virtual call number $VCN_0$ ("a") of the input cell, and a virtual call number $VCN_1$ ("b" in the illustration) for a next link through which the cell is transmitted to a subsequent self-routing switching network or a terminal. The route number and the virtual call number $VCN_1$ ("b") for the next link are provided call by call in the VCN conversion table shown in FIG. 3 by the CPU 70. Then the conversion module 20 sends the input cell having information INF and the virtual call number $VCN_1$ ("b") to the active SRM network 30. As will be described in detail later, each of the SRM networks 30 and 40 includes a plurality of stages each having a plurality of SRM modules (see FIG. 12). The SRM modules at the different stages are connected to lines or paths. The cell input to the conversion module 20 is transmitted in a route of lines connecting the different stages and is then supplied to the output module 50. The cell from the output module 50 is sent to the output highway 60 through the output module 50. The above-mentioned procedure is indicated by P1 (FIG. 2).

Before the active SRM network is actually switched from the SRM network 30 to the SRM network 40, input cells on the input highway 10 are temporarily stored in a queuing buffer provided in the conversion module 20. This procedure is indicated by P2. On the other hand, all cells in the SRM network 30 must be completely discharged to the output module 50 as indicated by P3 before the active SRM network is actually switched to the SRM network 40. For this purpose, the CPU 70 starts an internal timer when a change of the active SRM network is requested through an external device (not shown) such as a console connected to the CPU 70. The CPU 70 always determines whether or not a predetermined time has passed. It is possible to know a time it takes to completely output all cells in the SRM network 30 beforehand, for example, at the stage of designing the system. The predetermined time is set equal or greater than such a time. When it is determined that the predetermined time has passed, as indicated by P4, the CPU 70 controls the conversion module 20 so as to output the buffered cells to the SRM network 40 and controls the output module 50 so as to receive cells from the SRM network 40. Then cells queued in the queuing buffer in the conversion module 20 are output to the SRM network 40 which is now changed to the active system, as indicated by P5. In this manner, the active network is switched from the SRM network 30 to the SRM network 40 after the predetermined time passes.

In order to achieve the state where all cells in the active SRM network have already been output to the output module 50 when a request to change the active SRM network is generated, it is necessary to provide a sufficient time interval between the occurrence of the request and actual switching. If the predetermined time is not sufficient, some of cells are left in the active SRM network and thus lost. Further, when a small number of cells is left on the output side of the active SRM module, it is not necessary to measure the entire predetermined time. The second embodiment of the present invention is directed to improving the first embodiment of the present invention.

The self-routing switching system according to the second embodiment of the present invention shown in FIG. 4 is composed of a conversion module 120 and an output module 150, which are substituted for the conversion module 20 and the output module 50, respectively. The control operation of the CPU 70 shown in FIG. 4 is different from that of the CPU 70 shown in FIG. 1, as will be seen from the following description. The conversion module 120 includes a buffer 121 which temporarily stores input cells on the input highway 10, a discharge confirmation cell generator 122, and a selector 123. The output module 150 includes a selector 151, and a discharge confirmation cell detector 152. The system shown in FIG. 4 includes the doubled SRM networks 30 and 40.

In the case where the SRM network 30 is working as the active system, input cells on the input highway 10 are once stored in the buffer 121 and are then output to the SRM network 30 through the selector 123, which is controlled by the CPU 70. Then the cells are output from the SRM network 30 and then transmitted to the output highway 60 through the selector 151 and the discharge confirmation cell detector 152 of the output module 150.

When a request to switch from the SRM network 30 to the SRM network 40 is input to the CPU 70 from a console (not shown in FIG. 4), the CPU 70 instructs the discharge confirmation cell generator 122 to generate a discharge confirmation cell, and instructs the selector 123 to connect the discharge confirmation cell generator 122 to the SRM network 30. The discharge confirmation cell from the discharge confirmation cell generator 122 passes through the selector 123 and is input to the SRM network 30 which is working. The discharge confirmation cell passes through the SRM network 30 and is input to the discharge confirmation cell detector 152 through the selector 151 of the output module 150. The discharge confirmation cell detector 152 detects the discharge confirmation cell from the SRM network 30, and informs the CPU 70 of the fact of detection. When the discharge confirmation cell is detected, it can be determined that all cells left in the SRM network 30 when the request occurs have been output therefrom completely. Thus, the CPU 70 controls the selector 123 of the conversion module 120 so as to connect the buffer 121 and the SRM network 40, and controls the selector 151 of the output module 150 so as to select the SRM network 40. Thereby, a route of connecting the conversion module 120, the SRM network 40 and the output module 150 is established.

The self-routing switching system shown in FIG. 4 can eliminate a problem of the system shown in FIG. 1. It is noted that in the system shown in FIG. 1 their is a possibility that some of the cells left in the active SRM network may be lost in case where the aforementioned predetermined time is insufficient. In other words, the system shown in FIG. 1 does not have a means for determining whether or not all cells left in the active SRM network have actually been output.

Figure 5:
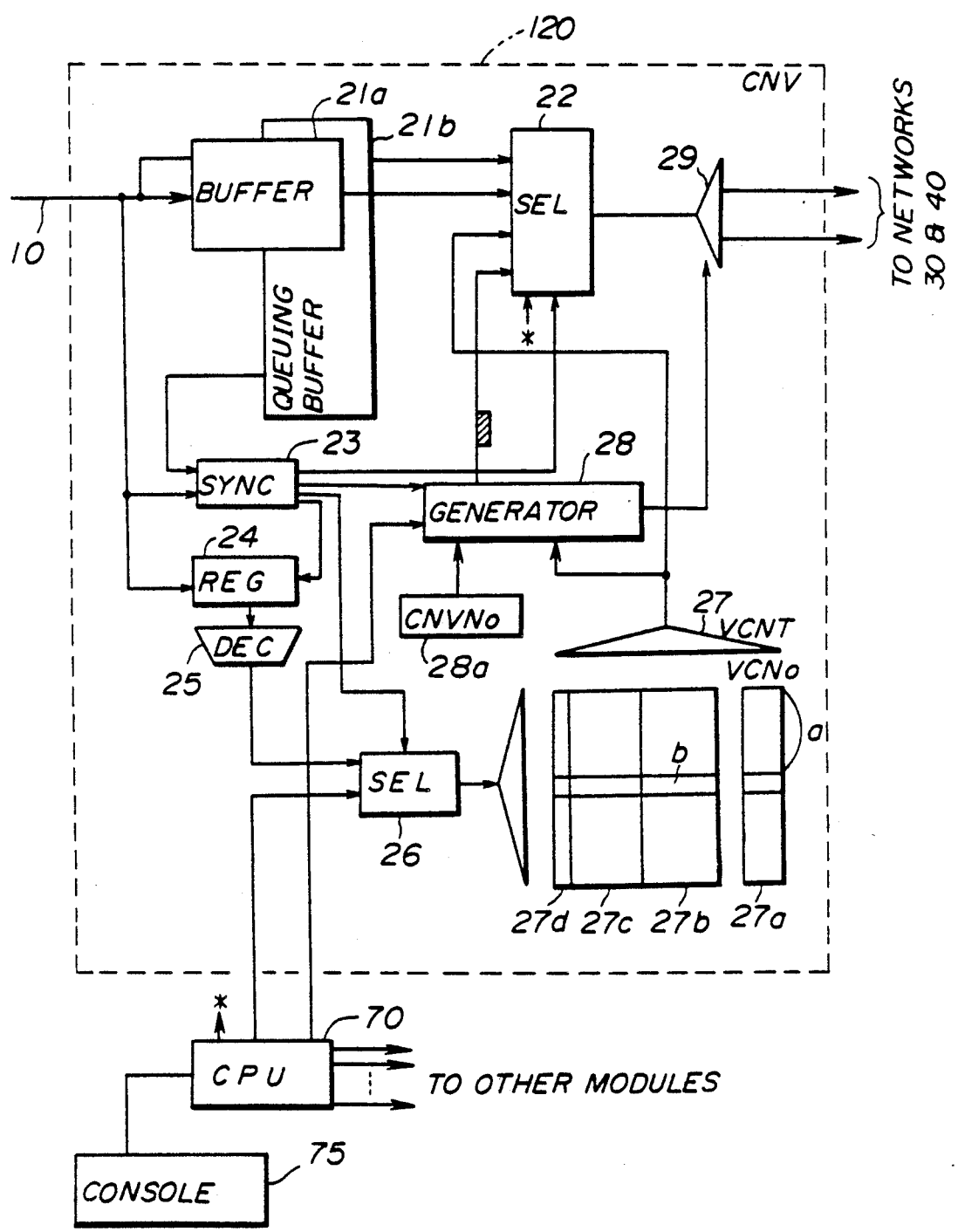
FIG. 5 is a block diagram of a conversion module (input module) provided in the configuration shown in FIG. 4.

Referring to FIG. 5, there is illustrated a detailed configuration of the conversion module 120. The conversion module shown in FIG. 5 is made up of a buffer 21a, a queuing buffer 21b, a selector 22, a synchronizing circuit 23, a register 24, a decoder 25, a selector 26, a VCN conversion table memory 27, a discharge confirmation cell generator 28, a register 28a and a selector 29. The configuration shown in FIG. 5 is an improvement in a configuration disclosed in International Publication Number WO 88/05982, the disclosure of which is hereby incorporated by reference.

Figure 6:
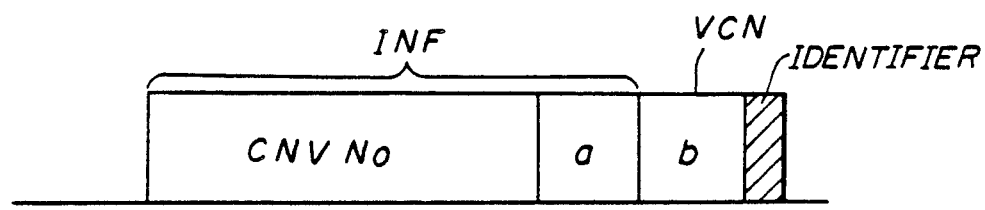
FIG. 6 is a block diagram illustrating a format of a discharge confirmation cell used in the second embodiment shown in FIG. 4.

The discharge confirmation cell generator 28 generates the discharge confirmation cell having a format shown in FIG. 6. As is shown, the discharge confirmation cell contains a discharge confirmation cell identifier illustrated by the hatched block, the virtual call number $VCN_1$ for the next link and transmission information INF. The discharge confirmation cell identifier is a one-bit flag. Normally, each cell has a definite length and contains some auxiliary (service) bits. One of the auxiliary bits is used for forming the discharge confirmation cell identifier. The position of the discharge confirmation cell identifier is not limited to the beginning of the cell. The virtual call number $VCN_1$ ("b") is read out from the VCN conversion table memory 27 according to the virtual call number $VCN_0$ ("a"). A reference CNVNo, which is contained in the transmission information INF, indicates the number of the conversion module 20, which is supplied from the register 28a.

As is shown in FIG. 5, the VCN conversion table memory 27 has, for each call, an area 27a for storing a virtual call number $VCN_0$, an area 27b for storing a virtual call number $VCN_1$ for a next link, an area 27c for storing a route number, and an area 27d for storing data indicating whether or not the virtual call number $VCN_1$ for a related next link is in a communication state. When each virtual call number $VCN_1$ is in the communication state, a flag of "1" is stored in a corresponding portion of the area 27d. On the other hand, when each virtual call number $VCN_1$ is in a non-communication state, a flag of "0" is stored in a corresponding portion of the area 27d. The CPU 70 sets the flag in the area 27d for every call.

The buffer 21a stores cells transmitted from the input highway 10. The synchronizing circuit 23 synchronizes with each cell from the input highway 10 or the buffer 21b by using the aforementioned synchronizing pattern in the header thereof. The register 24 stores the virtual call number $VCN_0$ of the input cell ("a" in FIG. 5) at a timing defined by the synchronizing circuit 23. The decoder 25 decodes the virtual call number $VCN_0$ of the input cell ("a") and generates a corresponding address of the VCN conversion table 27. The address from the decoder 25 passes through the selector 26, which is controlled by the synchronizing circuit 23. That is, each time a call is input to the synchronizing circuit 24, the selector 26 passes the address from the decoder 25. When the address corresponding to the virtual call number $VCN_0$ ("a") is input to the VCN conversion table memory 27, the corresponding virtual call number VCN ("b") of the cell in the next link and the route number are read out therefrom. The selector 22 is controlled by the CPU 70 so that the virtual call number $VCN_1$ ("b") and the route number are added to the corresponding cell which is read out from the buffer 21a or 21b. Thus, the selector 22 outputs the route number, the virtual call number $VCN_1$ and transmission information in this order. Normally, the selector 29 selects the active SRM network (the SRM network 30 for example). The output signal from the selector 22 is supplied to the SRM network 30 through the selector 29.

When a request to switch the active SRM network from the SRM network 30 to the SRM network 40 is input to the CPU 70 through a console 75 (FIG. 5), the CPU 70 instructs the discharge confirmation cell generator 28 to read out, from the VCN conversion table memory 27, the virtual call number $VCN_0$ ("a") and a virtual call number $VCN_1$ ("b") which is in the communication state. Further, the CPU 70 instructs the discharge confirmation cell generator 28 to read out the number $CVCN_0$ of the conversion module 120 from the register 28a. Then the discharge confirmation cell generator 28 forms the discharge confirmation cell (illustrated by the hatched block in FIG. 5) having the format shown in FIG. 6. At the same time, the discharge confirmation cell generator 28 controls the selector 22 so as to select the discharge confirmation cell and controls the selector 29 to output the same to the SRM network 30, which is working as the active SRM network. Then the CPU 70 sets the flag in area 27d to "0".

As will be described in detail later, when the output module 150 (FIG. 7) detects the discharge confirmation cell and lets the CPU 70 know the fact of detection, the CPU 70 reads out the cells from the queing buffer 21b (queuing cells) and supplies the same to the synchronizing circuit 23. Then the route number, the virtual call number $VCN_1$ ("b") and the transmission information are added to each of the cells from the synchronizing circuit 23 due to the functioning of the selector 22 in the same manner as described previously. When the CPU 70 is informed that the discharge confirmation cell is detected by the output module 150, the CPU 70 controls the selector 29 so as to select the SRM network 40, whereby it is now switched to the active network. The output signal from the selector 22 is supplied to the SRM network 40 through the selector 29.

Referring to FIG. 7, there is illustrated a configuration of the output module 150. As is shown, the output module 150 is composed of a selector 51, a discharge confirmation cell detector 52, and a memory 53. The selector 51 selectively connects one of the SRM networks 30 and 40 to the discharge confirmation cell detector 52, which detects the discharge confirmation cell. As described previously, the discharge confirmation cell has the specific identifier placed, for example, at the beginning of the format thereof. The discharge confirmation cell detector 52 determines whether or not each received cell has the specific identifier, for example, at the beginning thereof. When detecting the discharge confirmation cell, the discharge confirmation cell detector 52 writes it into the memory 53. The CPU 70 determines whether or not the discharge confirmation cell detector 52 outputs an interrupt signal (switching signal) indicative of detection of the discharge confirmation cell. Alternatively, the CPU 70 periodically scans the memory 53, and determines whether or not there is the discharge confirmation cell in the memory 53.

When the CPU 70 knows the fact that the discharge confirmation cell has been detected, the CPU 70 reads out the conversion module number $CNVN_0$ and the virtual call numbers $VCN_0$ and $VCN_1$ from the memory 53. Then the CPU 70 instructs the selector 29 (FIG. 5) of the conversion module 120 to connect the selector 22 to the SRM network 40 and instructs the selector 22 to select the queuing buffer 21b. Further, the CPU 70 instructs the selector 51 (FIG. 7) of the output module 150 to connect the SRM network 40 and the discharge confirmation cell detector 52.

FIGS. 5 and 7 illustrate one of the conversion modules 120 and one of the output modules 150, respectively. In actuality, as shown in FIG. 1, the self-routing switching system has a plurality of conversion modules each having the same structure as the conversion module 120, and a plurality of output modules each having the same structure as the output module 150. The plurality of conversion and output modules 120 and 150 are controlled by the CPU 70. In this case, the CPU 70 is required to detect discharge confirmation cells supplied from all the conversion modules 120 and then switch the active network.

Figure 8:
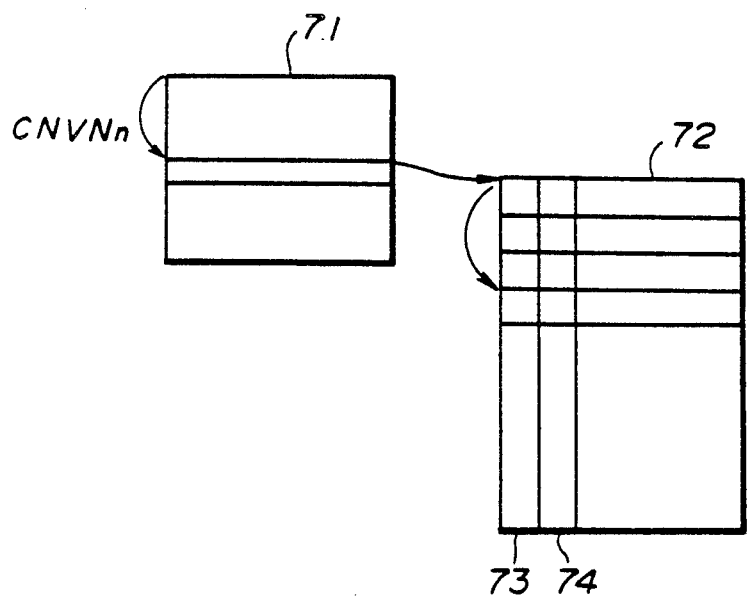
FIG. 8 is a diagram showing how to manage a call by a central processing unit used in the second embodiment shown in FIG. 4.

For this requirement, the CPU 70 manages calls from the conversion modules 120 by using tables 71 and 72 illustrated in FIG. 8. The table 71 corresponds to the table shown in FIG. 3. The table 72 is provided in the CPU 70, and has divided areas 73 and 74. The area 73 stores data indicating whether or not each virtual call number $VCN_1$ is in the communication state ("1" indicates the communication state, and "0" indicates the non-communication state). The area 74 stores data indicating whether each virtual call number $VCN_1$ is in a state where related cells are being discharged or in a state where all related cells have been discharged. When the conversion module number $CNVN_n$ (n is an integer) and the virtual call number $VCN_0$ are read out from the memory 53, the CPU 70 individually writes "0" into corresponding portions of the areas 73 and 74. When the CPU 70 detects the fact that "0" are written into all the portions of the area 74, the CPU 70 controls all the conversion and output modules 120 and 150 so as to select the standby SRM network.

Figure 9:
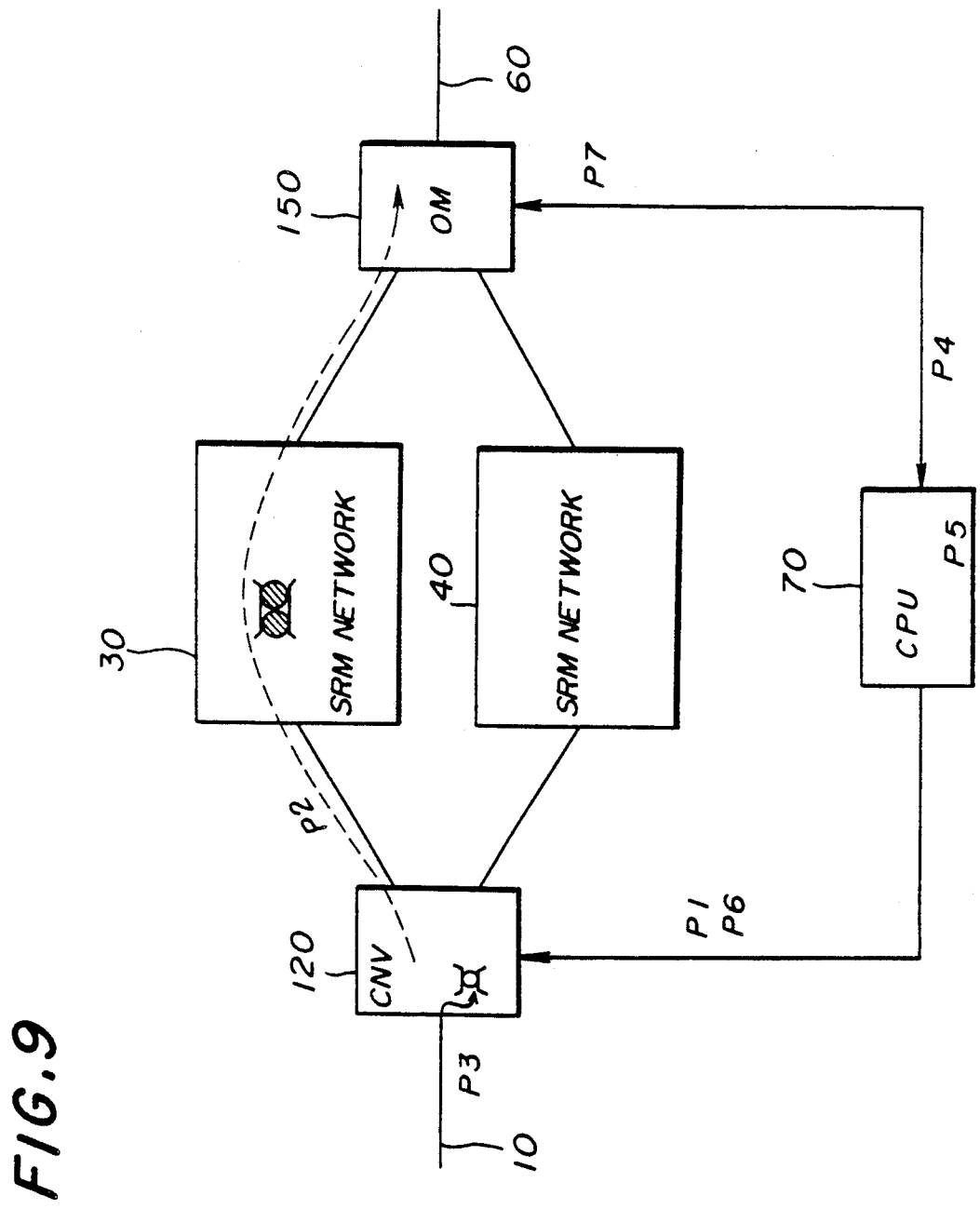
FIG. 9 is a block diagram illustrating how to switch the network from an active self-routing switch module network to a standby one according to the second embodiment shown in FIG. 4.

A further description is given of the operation of the second embodiment with reference to FIG. 9. The CPU 70 instructs the conversion module 120 to start the aforementioned procedure for switching the active SRM network (P1). In response to this instruction, the discharge confirmation cell generator 28 sends the discharge confirmation cell to the active SRM network 30 in the aforementioned procedure (P2). An input cell which is received after the discharge confirmation cell is sent to the SRM network 30, is stored in the queuing buffer 21b shown in FIG. 5 (P3). The discharge confirmation cell detector 52 (FIG. 7) of the output module 150 detects the discharge confirmation cell from the SRM network 30. The CPU 70 knows the fact of the detection of the discharge confirmation cell in the aforementioned manner (P4). Then the CPU 70 reads out, from the memory 53 (FIG. 7), the conversion module number $CNVN_n$ and the virtual call number $VCN_0$ of the input cell contained in the received discharge confirmation cell (P5). When the CPU 70 is notified that the discharge confirmation cell from the conversion module 120 has been detected, it instructs the conversion module 120 to send the cells in the queuing buffer 21b to the SRM network 40. More specifically, when the discharge confirmation cells have been detected, the CPU 70 instructs all the conversion modules including the conversion module 120 to send cells in the individual queuing buffers to the SRM network 40. Then the active SRM network 30 is switched to the standby network, and instead the standby SRM network 40 is made active.

Figure 10:
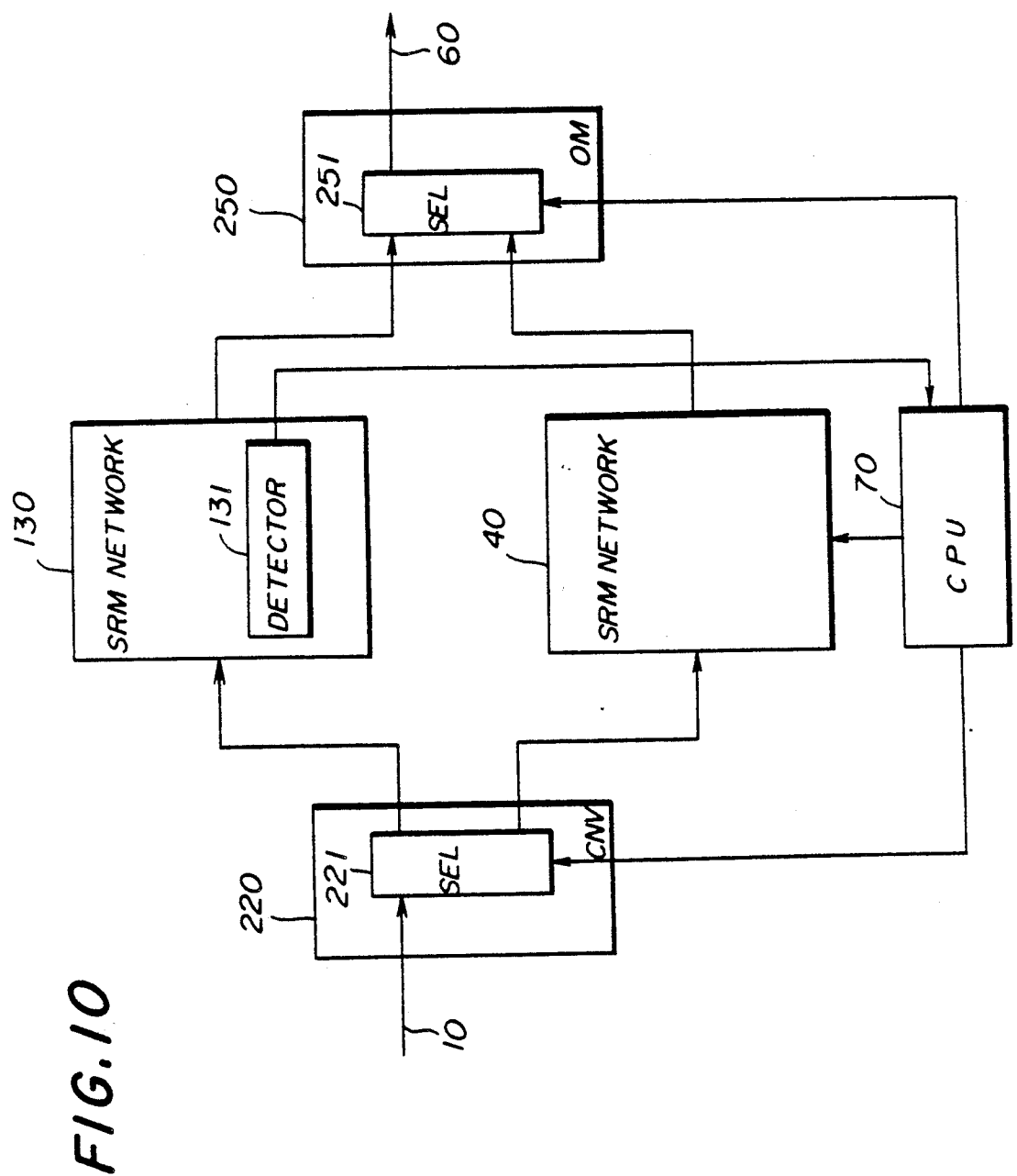
FIG. 10 is a block diagram of a third preferred embodiment of the present invention.

A description is given of the self-routing switching network according to a third preferred embodiment of the present invention. Referring to FIG. 10, there is illustrated an outline of the third embodiment. A conversion module 220 and an output module 250 are substituted for the conversion module 120 and the output module 150, respectively. The conversion module 220 includes a selector 221, which selectively connects the input highway 10 to either an SRM network 130 or the SRM network 40. The output module 250 includes a selector 251, which connects one of the SRM module 130 and the SRM network 40 to the output highway 60. The SRM network 130, which is provided instead of the SRM network 30, is configured by adding a detector 131 to the SRM network 30. The detector 131 determines whether or not there is any cell in the SRM network 130. Although a detector corresponding to the detector 131 is not provided for the SRM network 40, in actuality, it is preferable to provide the SRM network 40 with such a detector.

When the active SRM network 130 is working, each cell input to the conversion module 220 passes through the SRM network 130 and is supplied to the output module 250. When a request to change the active SRM network from the SRM network 130 to the SRM network 40 is input to the CPU 70, the CPU 70 instructs the selector 221 to connect the input highway 10 to the SRM network 40. Each cell addressed to the conversion module 220 is sequentially stored in the SRM network 40 from the input side thereof. It is noted that the SRM network 40 functions as a queuing buffer during the switching procedure. On the other hand, cells in the SRM network 130 are continuously discharged to the output modules 250. When the detector 131 detects a state where there is no cell left in the SRM network 130, the detector 131 notices the CPU 70 of the detection. In response to the notice from the detector 131, the CPU 70 instructs the selector 251 to connect the output line 60 to the SRM network 40. Then cells stored in the SRM network 40 are sequentially read out therefrom and supplied to the output module 250.

It should be appreciated that cells input to the conversion module 220 after the request for switching is generated are queued in the SRM network 40. Thus, there is no need for providing the queuing buffer 21b (FIG. 5) in the conversion module 220.

Figure 11:
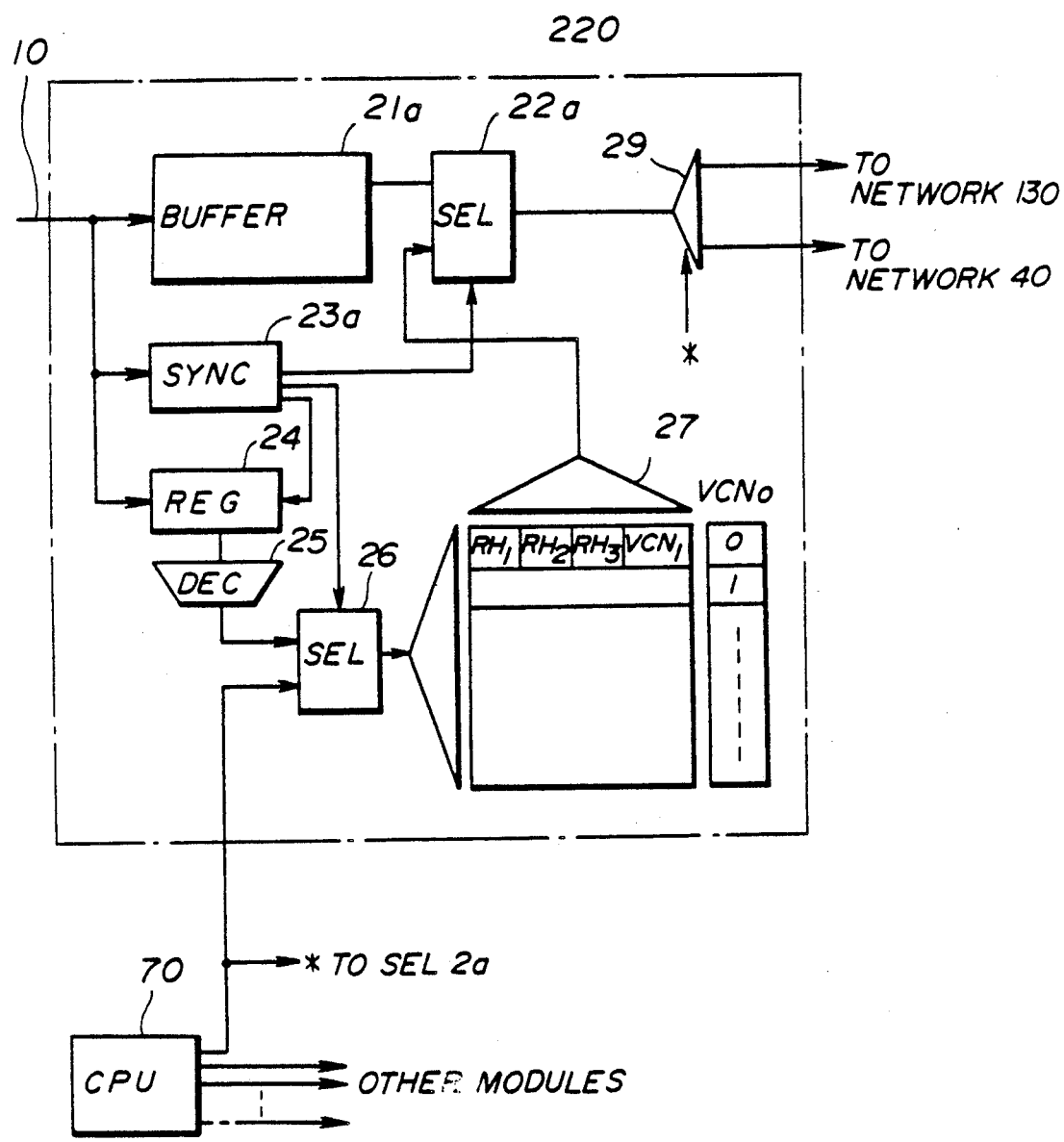
FIG. 11 is a block diagram of a conversion module provided in the third embodiment shown in FIG. 10.

FIG. 11 is a block diagram of the conversion module 220 shown in FIG. 10, which corresponds to a conversion module disclosed in the aforementioned International Publication Number WO 88/05982. In FIG. 11, those parts which are the same as those in FIG. 5 are given the same reference numerals. The conversion module 220 includes a synchronizing circuit 23a and a selector 22a which are substituted for the synchronizing circuit 23 and the selector 22. As described previously, each cell on the transmission line is actually composed of the transmission information and the header added thereto. The transmission information includes identification information (VCN). In the conversion module 220, the route number (control information) is added to the cell.

The calling part of the packet information carries out a call setting up phase for notifying the packet receiving party to the CPU 70 before the transmission of the cell. The CPU 70 sets the path of the speech path through which the cell is to pass by the notified receiving party and calling party and decides a virtual call number for the next link. The switching information of the switch modules to which the packet is input, that is, the control information $RH_1$, $RH_2$ and $RH_3$ (corresponding to the aforementioned route number), and the virtual call number for the next link are stored in the address corresponding to the virtual call number $VCN_0$ which indicates the receiving party.

Next, the cell is actually transmitted in the cell transfer phase. This cell is composed of the transmission information and the header portion containing the virtual call number $VCN_0$ added to the header of the transmission information. The synchronizing circuit 23a synchronizes with the input cell for the use of a synchronizing pattern in the header portion, and controls the timing of each part. The cell which is transferred to the speech path is stored in the buffer 21a, and the virtual call number $VCN_0$ of the input cell is input to the decoder 25 via the register 24 under the control of the synchronizing circuit 23a. When the decoder 25 receives the virtual call number $VCN_0$ of the input cell, the VCN conversion memory 27 is accessed using this virtual call number $VCN_0$ as the address. The VCN conversion table memory 27 stores therein the control information (route number composed of route headers) corresponding to the virtual call number $VCN_0$ and the virtual call number ($VCN_1$) showing the cell in the next link. To add the control information and $VCN_1$ to the packet header, the control information read out from the VCN conversion table memory 27 is sent to the selector 22a. The synchronizing circuit 23a performs switching control of the selector 22a, first sends out the control information and new virtual call number $VCN_1$, then reads out the transmission information portion of the packet from the buffer 21a and sends it through the selector 22a. The signal from the selector 22a is transmitted to one of the SRM networks 130 and 40.

Figure 12:
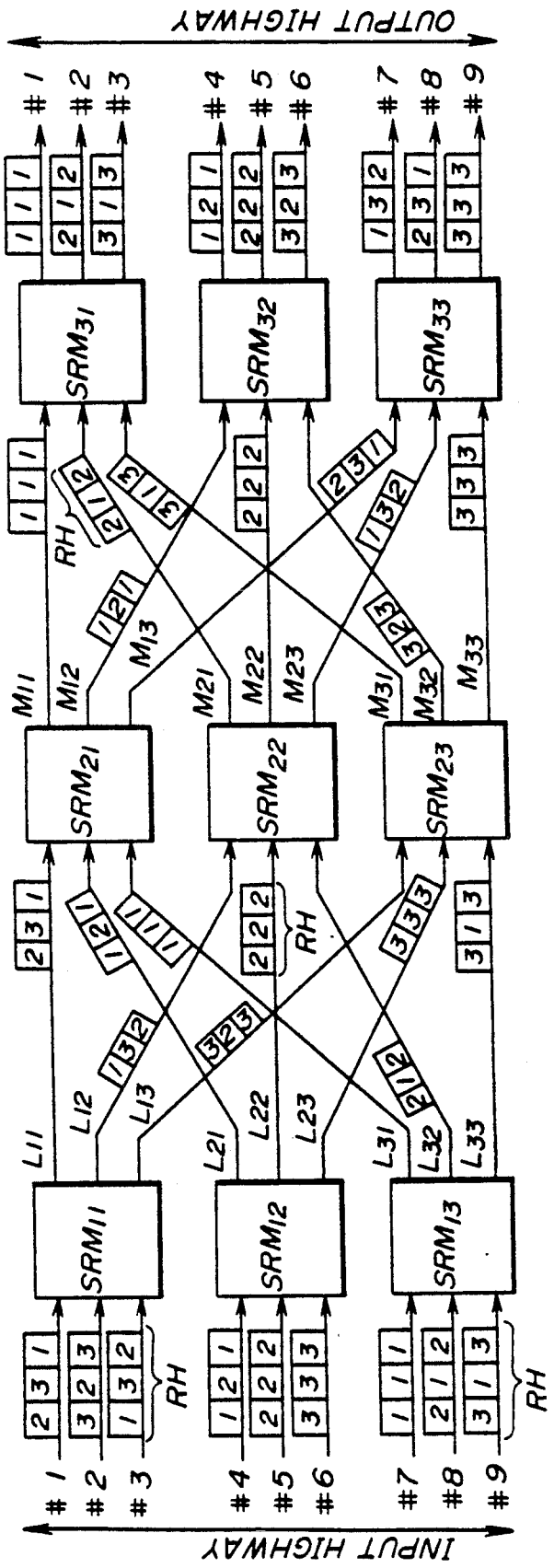
FIG. 12 is a block diagram of a general configuration of a self-routing switch module network used in each of the first to third embodiments.

FIG. 12 is a diagram of a configuration of the SRM network 130. The SRM network 40 also has a configuration identical to the illustrated configuration. FIG. 12 relates to the case where there are three 3×3 self-routing switch modules $SRM_{ij}$ at the input stage, middle stage and output stage. Primary links $L_{11}$, $L_{12}$ and $L_{13}$ connect the three output ends of the input stage switch module $SRM_{11}$ to the first top input ends of the middle stage switch modules $SRM_{21}$ to $SRM_{23}$. The primary links $L_{21}$ to $L_{23}$ and $L_{31}$ to $L_{33}$ follow this. The secondary links $M_{11}$ to $M_{13}$ connect the three output ends of the middle stage switch module $SRM_{21}$ to the first input ends of the three switch modules $SRM_{31}$ to $SRM_{33}$ of the output stage. The secondary links $M_{21}$ to $M_{23}$ and $M_{31}$ to $M_{33}$ follow the same.

Figure 13:
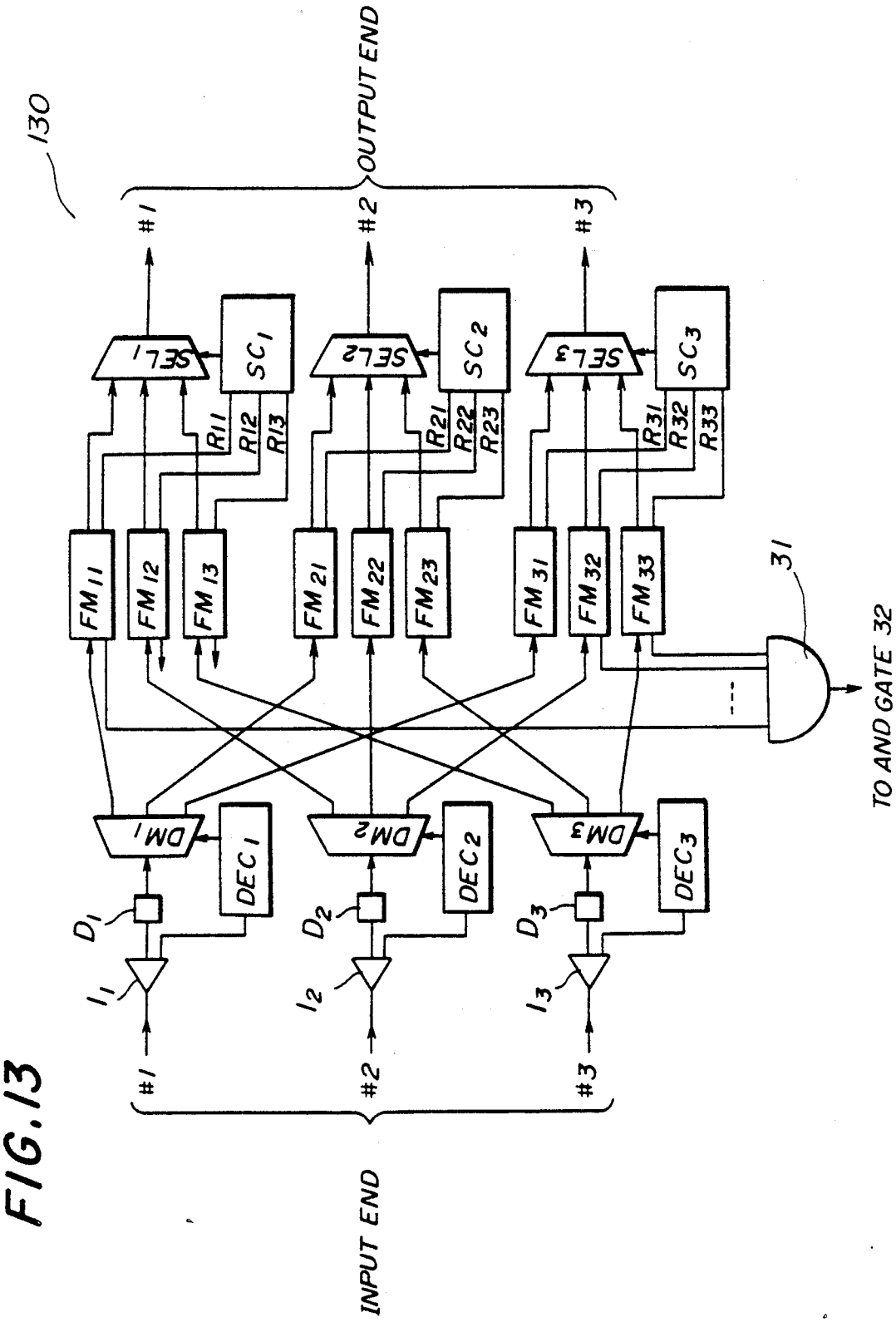
FIG. 13 is a block diagram of a self-routing module provided specifically for the third embodiment shown in FIG. 10.

Referring to FIG. 13, there is illustrated a configuration of the $SRM_{ij}$ shown in FIG. 12. The $SRM_{ij}$ is composed of control information detection circuits, $I_1$, $I_2$ and $I_3$, transmission information delay circuits $D_1$, $D_2$ and $D_3$, demultiplexers $DM_1$, $DM_2$ and $DM_3$, control information decode circuits $DEC_1$, $DEC_2$ and $DEC_3$, and buffer memories $FM_{11}$, $FM_{12}$, $FM_{13}$, $FM_{21}$, $FM_{22}$, $FM_{23}$, $FM_{31}$, $FM_{32}$ and $FM_{33}$. Each of the buffer memories $FM_{ij}$ is formed by a first-in first-out (FIFO) memory. The $SRM_{ij}$ is further composed of selectors $SEL_1$, $SEL_2$ and $SEL_3$, and selector control circuits $SC_1$, $SC_2$ and $SC_3$. The above-mentioned structural elements are also provided in the SRM network 40.

The signals entering the input ends #1 to #3 (i) take the form of the aforementioned transmission information plus control information. The detection circuits $I_i$ (i=1–3 in the illustrated case) extract the control information and send it to the decode circuits $DEC_i$. The control information comes in three types, a first stage (input stage) routing header RH1, a second stage (middle stage) routing header RH2, and a third stage (output stage) routing header RH3, when the SRM network 140 is comprised of three stages. The detection circuits $I_i$ extract the corresponding control information for the stages of the switch modules SRM. When the input control information indicates an output end j, a decode circuit $DEC_i$ operates a demultiplexer $DM_i$ and sends the transmission information to an FIFO memory $FM_{ji}$. For example, if the control information of the input end #1 indicates the output end #2, the decode circuit $DEC_1$ operates the demultiplexer $DM_1$ and inputs the information of the input end #1 to the FIFO memory $FM_{21}$. When the transmission information enters the FIFO memories $FM_{11}$ to $FM_{13}$, the selector control circuit SC1 operates the selector $SEL_1$ and sends the transmission information to the output end #1. The same follows for like elements of the SRM network 40 as well.

A selector control circuit $SC_j$, for example, continually scans for a request signal $R_{ij}$ from an FIFO memory $FM_{ij}$ and, when a request signal $R_{ij}$ is detected, operates so that the contents of that FIFO memory FM are output through a selector $SEL_i$. Alternatively, a request signal $R_{ij}$ is input to a selector control circuit $SC_j$ as an interruption input and, when an interruption occurs, the selector control circuit $SC_j$ outputs the content of the FIFO memory FM through the selector SEL.

If the FIFO memories $FM_{ij}$ are given a capacity corresponding to a plurality of cells, a buffer function is obtained and sufficient response is possible even when the transmission data increases temporarily.

The self-routing switch modules $SRM_{ij}$ are not limited to ones having three input ends and three output ends and in general may have n number of input ends and m number of output ends, where $n > m$ and $n = m$ or $n < m$. When $n > m$, there will be a plurality of input ends making common use of the same output end, but with calls (channel) with small values of transmission, this would be sufficient for processing. When $n < m$, a single input may be divided into two outputs and both input side high speeds and output side low speeds dealt with. Of course, the excess amount may be left unused.

Figure 14:
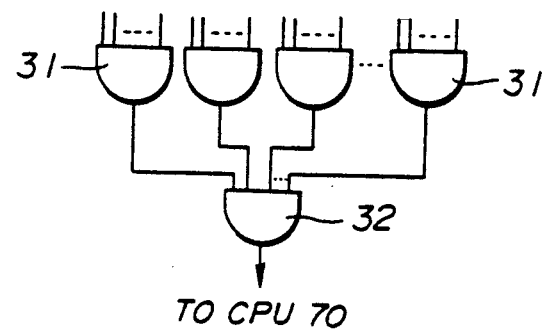
FIG. 14 is a block diagram illustrating how to collect signals from AND gates provided for the self-routing modules according to the third embodiment of the present invention.

The above description with reference to FIG. 13 holds true for the SRM network 40. As shown in FIG. 13, an AND gate 31 is provided specifically for the SRM network 140. The AND gate 31 corresponds to the detector 131 shown in FIG. 10. When a detector such as the detector 131 is provided for the SRM network, an AND gate is provided for the SRM network 40. Thereby, it is possible to effectively and efficiently switch the active SRM network from the SRM network 40 to the SRM network 130. Each of the FIFO memories $FM_{ij}$ outputs an indication signal when it discharges all cells completely so that it becomes empty. The AND gate 31 is provide for each of the FIFO memories $FM_{ij}$ as shown in FIG. 14. Output signals (indication signals) of the AND gates 31 are supplied to an AND gate 32, an output signal of which is supplied, as a switching signal, to the CPU 70.

Figure 15:
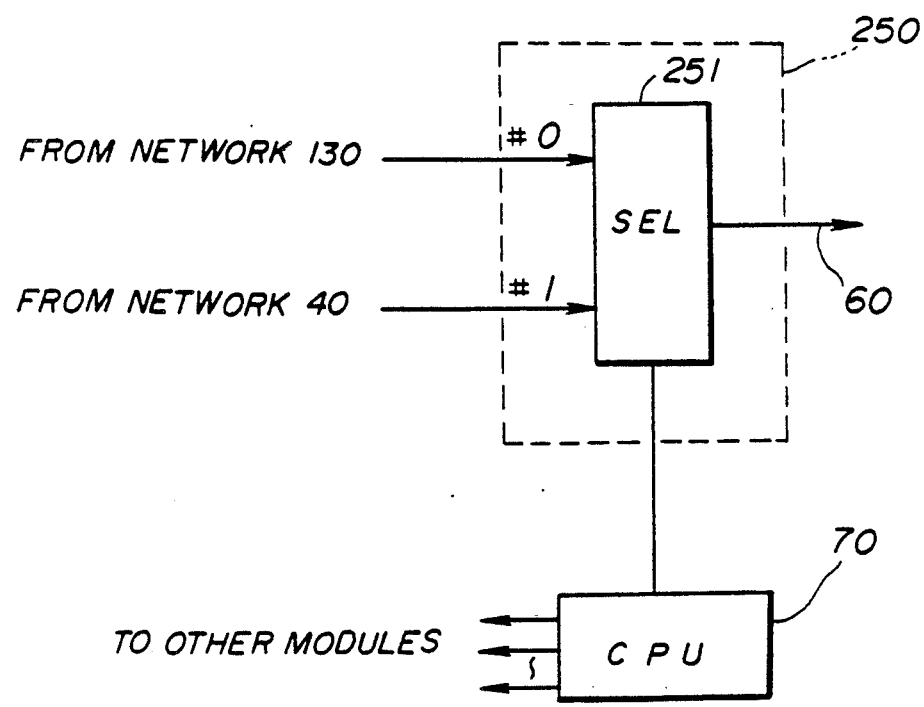
FIG. 15 is a block diagram of a configuration of an output module provided in the third embodiment shown in FIG. 10.

FIG. 15 is a block diagram of the output module 250. As shown, the output module 250 includes a selector 251, which connects one of the SRM networks 130 and 40 to the output highway 60.

Figure 16:
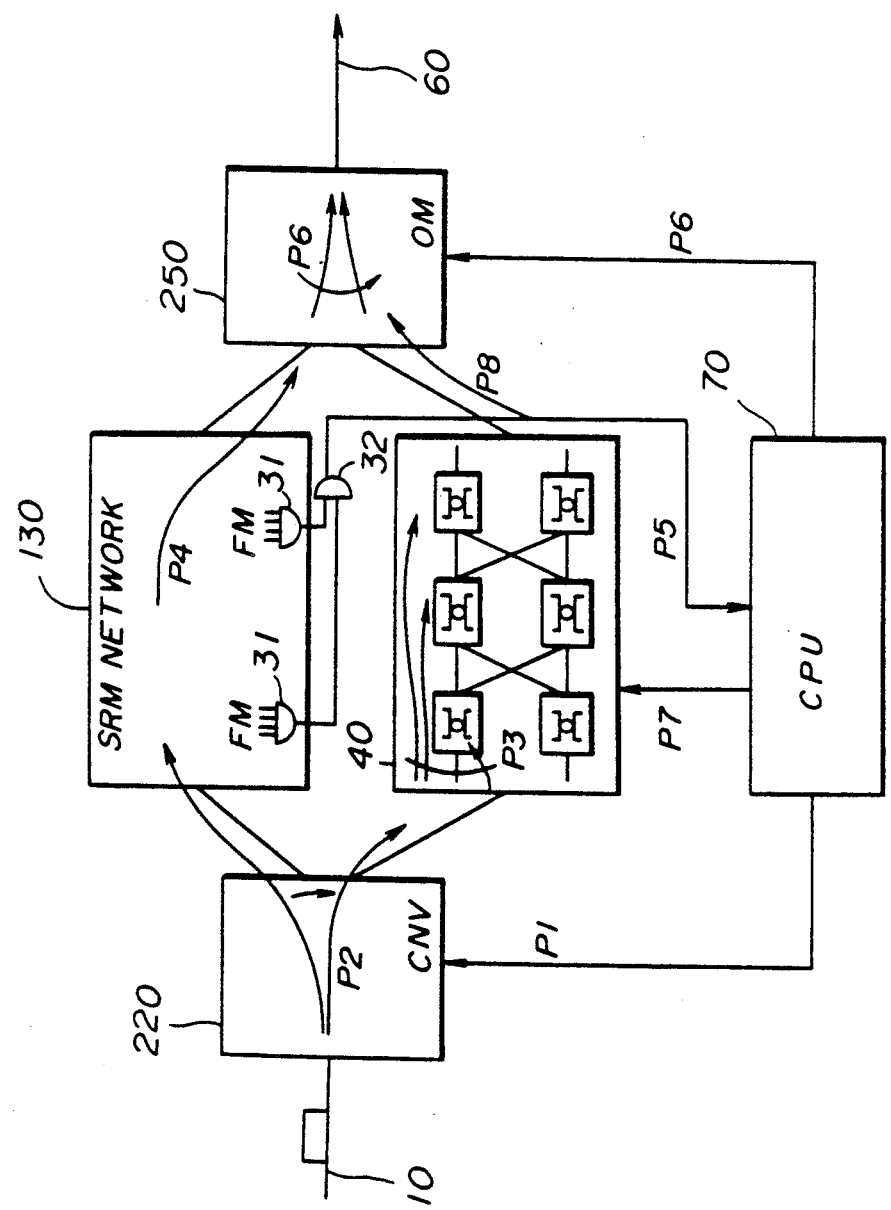
FIG. 16 is a block diagram illustrating how to switch the system from an active self-routing switch module network to a standby one according to the third embodiment shown in FIG. 10.

A description is given of the operation of the self-routing switching system according to the third preferred embodiment of the present invention with reference to FIG. 16. When receiving a request to switch the active system from the SRM network 130 to the SRM network 40, the CPU 70 supplies the selector 29 (FIG. 11) of the conversion module 220 with an instruction to connect the selector 22a to the SRM network 40 (P1). Each cell which is input to the conversion module after the instruction is generated is successively output to the SRM network 40 (P2). Then each cell is stored in the SRM network 40 from the $SRM_{31}$, $SRM_{32}$ and $SRM_{33}$ at the output stage thereof (P3). This is called a queuing mode. In the queuing mode, the CPU 70 prevents the SRM network 40 from outputting cells to the output module 250.

On the other hand, the SRM network 130 continues to operate and outputs cells stored therein to the output module 250 (P4). Each FIFO memory $FM_{ij}$ outputs the signal indicating that there is no cell therein when it becomes such a state. When all cells in the SRM network 130 are completely output to the output module 250, the indication signal output from the AND gate 32 is turned ON (P5). Then the CPU 70 instructs the selector 251 (FIG. 15) of the output module 250 to switch the connection from the SRM network 130 to the SRM network 40 (P6). Then the CPU 70 informs the SRM network 40 of the change from the queuing mode to the normal mode (P7). Thereby, the cells in the SRM network 40 are allowed to be output to the output module 250 (P8).

The present invention includes all self-routing switching networks in which cells are temporarily stored in a switching network such as the aforementioned SRM network. The present invention may be used for switching network of voice, facsimile data, computer data, and other switching data, in particular for high speed packet (cell) switching networks and high speed asynchronous transfer mode switching networks.

The present invention is not limited to the specifically described embodiments, and variations and modifications may be made without departing from the scope of the invention.

What is claimed is:

1. A self-routing switching system connected between input highways and output highways, comprising:

input means, operatively coupled to the input highways, for receiving a cell having transmission information from one of the input highways and for generating additive information indicative of a path through which the transmission information from the one of the input highways is supplied to one of the output highways;

first self-routing switch module network means for providing a plurality of paths operatively coupled between the input highways and the output highways, the cell being transmitted through one of the plurality of paths indicated by the additive information;

second self-routing switch module network means for providing a plurality of paths operatively coupled between the input highways and the output highways, the cell being transmitted through one of the plurality of paths indicated by the additive information;

first selecting means, provided between said input means and said first and second self-routing switch module network means, for connecting the input highways to one of said first and second self-routing switch module network means;

second selecting means, provided between said first and second self-routing switch module network means and the output highways, for connecting the output lines to one of said first and second self-routing switch module network means; and detecting means, operatively coupled to said first and second self-routing switch module network means, for detecting a state where there is no cell in one of said first and second self-routing switch module network means selected by said first selecting means.

2. A self-routing switching system connected between input highways and output highways, comprising:

input means, operatively coupled to the input highways, for receiving a cell having transmission information from one of the input highways and for generating additive information indicative of a path through which the transmission information from the one of the input highways is supplied to one of the output highways;

first self-routing switch module network means for providing a plurality of paths operatively coupled between the input highways and the output highways, the cell being transmitted through one of the plurality of paths indicated by the additive information;

second self-routing switch module network means for providing a plurality of paths operatively coupled between the input highways and the output highways, the cell being transmitted through one of the plurality of paths indicated by the additive information;

first selecting means, provided between said input means and said first and second self-routing switch module network means, for connecting the input highways to one of said first and second self-routing switch module network means;

second selecting means, provided between said first and second self-routing switch module network means and the output highways, for connecting the output lines to one of said first and second self-routing switch module network means;

detecting means, operatively coupled to said first and second self-routing switch module network means, for detecting a state where there is no cell in one of said first and second self-routing switch module network means selected by said first selecting means, and the one of said first and second self-routing switch module network means functioning as an active network and the other one thereof functioning as a standby network; and wherein said first and second selecting means switch connections to the input and output lines from the active network to the standby network when said detecting means detects the state.

3. A self-routing switching system as claimed in claim 1, wherein one of said first and second self-routing switch module network means functions as an active network and the other functions as a standby network, and wherein said self-routing switching system further comprises control means for determining whether or not a predetermined time passes after a request to change said active network is input thereto and for controlling said first and second selecting means to select connections to the input and output lines from the active network to the standby network when said control means determines that the predetermined time has passed.

4. A self-routing switching system as claimed in claim 3, wherein the predetermined time corresponds to a time which ensures that cells in the active network are completely discharged to the output lines through said second selecting means when the predetermined time has passed.

5. A self-routing switch system connected between input highways and output highways, comprising:

input means, operatively coupled to the input highways, for receiving a cell having transmission information from one of the input highways and for generating additive information indicative of a path through which the transmission information from the one of the input highways is supplied to one of the output highways;

first self-routing switch module network means for providing a plurality of paths operatively coupled between the input highways and the output highways, the cell being transmitted through one of the plurality of paths indicated by the additive information;

second self-routing switch module network means for providing a plurality of paths operatively coupled between the input highways and the output highways, the cell being transmitted through one of the plurality of paths indicated by the additive information;

first selecting means, provided between said input means and said first and second self-routing switch module network means, for connecting the input highways to one of said first and second self-routing switch module network means;

second selecting means, provided between said first and second self-routing switch module network means and the output highways, for connecting the output lines to one of said first and second self-routing switch module network means;

wherein one of said first and second self-routing switch module network means functions as an active network and the other functions as a standby network; and wherein said self-routing switch system further comprises:

specific cell generating means, operatively coupled to said input means, for generating a specific cell when a request to switch connection from the active network to the standby network is input thereto and for sending the specific cell to the active network through said first selecting means;

specific cell detecting means, operatively coupled to said second selecting means, for detecting the specific cell supplied from the active network;

control means, operatively coupled to said specific cell detecting means and said first and second selecting means, for controlling said first and second selecting means to select the standby network instead of the active network when said specific cell detecting means detects the specific cell.

6. A self-routing switching system as claimed in claim 5, wherein said self-routing switch system further comprises buffer means coupled to the input highways, for storing cells supplied from the input highways after the request is input to said specific cell generating means.

7. A self-routing switching system as claimed in claim 6, wherein when said specific cell detecting means detects the specific cell, the cells stored in said buffer means are sent to said first selecting means.

8. A self-routing switching system as claimed in claim 5,
wherein the specific cell has an identifier indicating the specific cell, and
wherein said specific cell detecting means comprises means for determining whether each of the cells has the identifier.

9. A self-routing switching system as claimed in claim 5, wherein said self-routing switching system further comprises memory means for storing the specific cell detected by said specific cell detecting means.

10. A self-routing switching system as claimed in claim 9, wherein said control means comprises means for periodically accessing said memory means and determining whether or not the specific cell detected by said specific cell detecting means is stored in said memory means.

11. A self-routing switching system as claimed in claim 5, wherein said specific cell detecting means generates a switching signal to be supplied to said control means when detecting the specific cell.

12. A self-routing switching system as claimed in claim 2,
wherein said first self-routing switch module network means comprises a plurality of self-routing switch modules each buffering cells and outputting an indication signal indicating whether or not there is a cell therein, and
wherein said detecting means comprises logic means for determining whether or not the indication signal from each of said plurality of self-routing switch modules has been output.

13. A self-routing switching system as claimed in claim 12, wherein said logic means comprises an AND gate for receiving the indication signal from each of said plurality of self-routing switch modules and for outputting and AND logic result to be supplied to said detecting means.

14. A self-routing switching system as claimed in claim 12,
wherein each of said plurality of self-routing switch modules includes a plurality of buffer memories each outputting a local indication signal indicating whether or not there is a cell therein, and
wherein said logic means comprises
a first AND gate for receiving the local indication signal from each of said plurality of buffer memories provided in each of said plurality of self-routing switch modules and for outputting and AND logic result; and
a second AND gate for receiving the AND logic result supplied from said first AND gate provided for each of said plurality of self-routing switch modules and for outputting and AND logic result to be supplied to said detecting means.

15. A self-routing switching system as claimed in claim 5,
wherein said control means controls said first selecting means to select the standby network instead of the active network when the request is supplied thereto and controls said second selecting means to select the standby network when said specific cell detecting means detects the specific cell, and
wherein cells from the input highways are buffered in the standby network until said second selecting means selects the standby network.

16. A self-routing switching system as claimed in claim 14, wherein each of said buffer memories comprises a first-in first-out memory.

17. A self-routing switching system connected between input highways and output highways, comprising:
input means, operatively coupled to the input highways, for receiving a cell having transmission information from one of the input highways and for generating additive information indicative of a path through which the transmission information from the one of the input highways is supplied to one of the output highways;
first self-routing switch module network means for providing a plurality of paths operatively coupled between the input highways and the output highways, the cell being transmitted through one of the plurality of paths indicated by the additive information;
second self-routing switch module network means for providing a plurality of paths operatively coupled between the input highways and the output highways, the cell being transmitted through one of the plurality of paths indicated by the additive information;
first selecting means, provided between said input means and said first and second self-routing switch module network means, for connecting the input highways to one of said first and second self-routing switch module network means;
second selecting means, provided between said first and second self-routing switch module network means and the output highways, for connecting the output lines to one of said first and second self-routing switch module network means;
detecting means, operatively coupled to said first and second self-routing switch module network means, for detecting a state where there is no cell in one of said first and second self-routing switch module network means selected by said first selecting means, and the one of said first and second self-routing switch module network means functioning as an active network and the other one thereof functioning as a standby network,
wherein said first and second selecting means switch connections to the input and output lines from the active network to the standby network when said detecting means detects the state, and
wherein cells from the input highways are buffered in the standby network until said second selecting means selects the standby network.

18. A self-routing switching system as claimed in claim 17,
wherein said detecting means outputs a discharged signal in dependence on the detection of the state, and
wherein said self-routing switching system further comprises control means for receiving the discharged signal, for controlling said first selecting means to select the standby network instead of the active network, and for controlling said second selecting means to select the standby network based on the discharged signal.

19. A self-routing switching system as claimed in claim 1, wherein said self-routing switching system further comprises control means for controlling detection of a complete discharge of all input cells from the one of said first and second self-routing switch module network means and for controlling switching from the one of said first and second self-routing switch module network means to the other of said first and second self-routing switch module network means.

20. A method for switching from an active self-routing switch module network to a standby self-routing switch module network, said method comprising the steps of:
 (a) receiving an input cell;
 (b) sending the input cell to the active self-routing switch module network;
 (c) receiving a switch requests;
 (d) temporarily storing input cells received in step (a) after the switch request is received in step (c);
 (e) detecting a complete discharge of all the input cells from the active self-routing switch module network; and
 (f) switching from the active self-routing switch module network to the standby self-routing switch module network when the complete discharge is detected in step (e).

21. A self-routing switching system as claimed in claim 1, wherein each of said first and second self-routing switch module network means comprises an asynchronous transfer mode switch network.

22. A self-routing switching system as claimed in claim 2, wherein each of said first and second self-routing switch module network means comprises an asynchronous transfer mode switch network.

23. A self-routing switching system as claimed in claim 5, wherein each of said first and second self-routing switch module network means comprises an asynchronous transfer mode switch network.

* * * * *

UNITED STATES PATENT AND TRADEMARK OFFICE
CERTIFICATE OF CORRECTION

PATENT NO. : 5,072,440

DATED : December 10, 1991

INVENTOR(S) : Isono et al.

It is certified that error appears in the above-identified patent and that said Letters Patent is hereby corrected as shown below:

Cover page, [56] References Cited, line 1, change "Charramsol" to --Charransol--;

[57], ABSTRACT, line 7, after "active" insert --SRM--.

Col. 1, lines 59-60, delete "filed Oct. 6, 1988.".

Col. 2, line 6, change "input" (first occurrence) to --unit--; line 21, change "means" to --unit--.

Col. 15, lines 40, 52 and 57, change "and AND" to --an AND--.

Col. 17, line 17, change "requests" to --request--.

Signed and Sealed this

Eighth Day of June, 1993

Attest:

MICHAEL K. KIRK

Attesting Officer

Acting Commissioner of Patents and Trademarks